United States Patent
Kasezawa et al.

(10) Patent No.: US 6,380,981 B1
(45) Date of Patent: Apr. 30, 2002

(54) FRAME SYNCHRONIZER (75) Inventors: Tadashi Kasezawa; Kenichi Asano; Masahiro Kazayama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/365,713

(22) Filed: Aug. 3, 1999

(30) Foreign Application Priority Data

Sep. 10, 1998 (JP) ............................................. 10-257146

(51) Int. Cl.⁷ ................................................. H04N 9/475
(52) U.S. Cl. ........................................ 348/515; 348/513
(58) Field of Search ................................. 348/515, 512, 348/513, 514, 518, 519; H04N 9/475

(56) References Cited

U.S. PATENT DOCUMENTS

| | | | |
|---|---|---|---|
| 4,249,198 A | * 2/1981 | Ito et al. ..................... | 348/515 |
| 5,430,485 A | 7/1995 | Lankford et al. | |
| 5,861,879 A | * 1/1999 | Shimizu et al. ............. | 348/513 |
| 5,877,815 A | * 3/1999 | Tsujimura ................... | 348/515 |

FOREIGN PATENT DOCUMENTS

| | | |
|---|---|---|
| JP | 05276158 | 10/1993 |
| JP | 06121276 | 4/1994 |
| JP | A 59138168 | 8/1994 |
| JP | 7177479 | 7/1995 |
| JP | 08261574 | 10/1996 |

* cited by examiner

Primary Examiner—Michael Lee (57) ABSTRACT

The frame synchronizer outputs, when reading out each of the video signals stored in a plurality of frame memories provided in a frame synchronizing circuit one by one, a read control signal from a video signal read control circuit for controlling the frame synchronizing circuit in such a manner as to read out a video signal of a frame other than that of a target frame which was to be read out otherwise, in case the input/output frame phase difference output from an input/output frame phase difference detecter comes up to an amount of one frame.

10 Claims, 6 Drawing Sheets

FRAME SYNCHRONIZER

BACKGROUND OF THE INVENTION

1. Field of the Invention

The present invention relates to a frame synchronizer for suppressing a timing discrepancy between a video signal and a corresponding audio signal in a digital image display device or the like to an amount below a predetermined level.

2. Description of the Related Art

Figure 7:
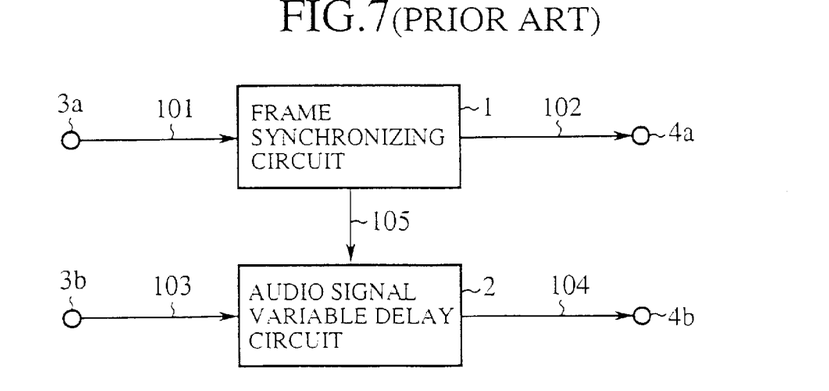
FIG. 7 is a schematic diagram showing the general configuration of a conventional frame synchronizer.

FIG. 7 is a schematic diagram showing the general configuration of a conventional frame synchronizer as disclosed in the "Audio phase automatic correction device (Japanese Patent Application Laid-Open No. 59-138168). In the figure, reference numeral 1 denotes a frame synchronizing circuit in the corresponding frame synchronizer, numeral 2 denotes an audio signal variable delay circuit, and numerals 3a and 4a denote respectively an input terminal and an output terminal for the frame synchronizing circuit 1, whereas numerals 3b and 4b denote an input terminal and an output terminal for the audio signal variable delay circuit 2, respectively. Further, reference numeral 101 denotes a video signal input through the input terminal 3a (hereinafter, a video input signal), 102 denotes an video signal to be output through the output terminal 4a (hereinafter, a video output signal), 103 denotes an audio signal input through the input terminal 3b (hereinafter, an audio input signal), 104 denotes an audio signal to be output through the output terminal 4b (hereinafter, an audio output signal) and reference numeral 105 denotes a delay control signal fed to the audio signal variable delay circuit from the frame synchronizing circuit 1.

The operation of the conventional frame synchronizer is now explained below.

Recently, there have been employed various frame synchronizers in TV broadcasting stations for the purpose of synchronizing video signals and corresponding audio signals, wherein each frame synchronizer is configured basically by a frame synchronizing circuit 1 and an audio signal variable delay circuit 2 as shown in FIG. 7.

The frame synchronizing circuit 1 above is generally provided with a plurality of frame memories, and the write operation to each of these frame memories is conducted in synchronization with the corresponding video input signal 101, whereas the read operation is carried out through a reference synchronization within individual stations. On this occasion, in a case that the frame signals stored within the frame memories are read out one after another, if there comes a moment at which none of the signals therein has been read out yet, then one of the frames is deleted, whereas if there comes a moment at which there are no signals left which have not been read out yet, one of the frames is read out again, so as to effectuate the frame synchronizing function.

Further, in order to adjust the timing discrepancy between a video output signal 102 which is read out from the frame memory to be output to the output terminal 4a and an audio output signal 104 which is to be output from the output terminal 4b, the frame synchronizing circuit 1 delays a corresponding audio input signal 103 input through the input terminal 3b by sending a delay control signal 105 to the audio signal variable delay circuit 2, and outputs the thus synchronized audio output signal to the output terminal 4b as an audio output signal 104. On this occasion, the audio input signal 103 is delayed in the audio signal variable delay circuit 2 for a certain time period equivalent to the difference between the write timing to the frame memory and the read timing therefrom.

It is to be noted that there have been published various reference documents related to the frame synchronization such as: Japanese Patent Application Laid-Open No. 5-276158, which discloses that in case one of the video and audio signals is delayed for more than a predetermined time period, the delayed signal data is deleted; Japanese Patent Application Laid-Open No.6-121276, which discloses that when a video signal is delayed with respect to a corresponding audio signal, the processing of that video signal frame is suspended and the following video signal is processed first; Japanese Patent Application Laid-Open No.7-177479, which discloses that even if there occurs an error in the synchronization, it can be restored correctly due to the time stamp provided to both video and audio signals; and further, Japanese Patent Application Laid-Open No.8-261574, which discloses that an audio signal is delayed in accordance with the delayed amount of a corresponding video signal so as to be synchronized with each other.

Since the conventional frame synchronizer is configured as such, the timing discrepancy between a video signal and a corresponding audio signal has to be adjusted in the audio signal variable delay circuit 2, and it is required to suitably delete or repeat this audio signal in order to synchronize it with a reference synchronization within individual stations, so that there has been such a problem that the sequence (or succession) of a sound is interrupted when the deletion or repetition of audio signals is conducted.

Further, the timing for deleting a frame or repeating the same frame twice in the frame synchronizing circuit 1 is based on the occupied state of the memory, so that there has been such a problem that the successive motion of a picture image is interrupted when the deletion or twice reading of one frame is carried out.

SUMMARY OF THE INVENTION

The present invention has been proposed to solve the problems aforementioned, and it is an object of the present invention to provide a frame synchronizer capable of eliminating interruption in the sequence of a sound.

It is another object of the present invention to provide a frame synchronizer capable of eliminating interruption in the successive motion of a picture image.

In order to achieve the above object, a frame synchronizer according to the first aspect of the present invention comprises: a frame synchronizing means for storing input video signals of a plurality of frames, and outputting the stored video signals one after another; an input/output frame phase difference detection means for detecting a phase difference between a video signal input frame pulse used for storing each of the input video signals in the frame synchronizing means and a video signal output frame pulse used for reading out each of the stored video signals from the frame synchronizing means, a video signal read control means for generating a read control signal for controlling the frame synchronizing means in such a manner as to read out the video signal of a frame other than that of the target frame which was to be read out otherwise, when the input/output phase difference detected by the input/output frame phase difference detection means comes up to an amount of one frame, an audio signal output clock generating means for generating an audio signal output clock in synchronization with a video signal output clock which is used, together with the video signal output frame pulse, for reading out the video signals from the frame synchronizing means, and a sampling rate converting means for converting the sampling rate of the audio input signal to that corresponding to the audio signal output clock, and outputting the input audio signal whose sampling rate has been converted as an audio output signal.

A frame synchronizer according to a second aspect of the present invention comprises: a video signal rearranging means for storing input video signals of a plurality of frames, rearranging the order of the frames, and outputting each of the frames whose order has thus been rearranged, an input/output frame phase difference detection means for detecting a phase difference between a video signal input frame pulse used for inputting each of the video signals to the video signal rearranging means and a video signal output frame pulse used for outputting each of the video signals from the video signal rearranging means, a video signal read control means for generating a read control signal for controlling the video signal rearranging means in such a manner as to output the video signal of a frame other than that of the target frame which was to be output otherwise, when the input/output phase difference detected by the input/output frame phase difference detection means comes up to an amount of one frame, an audio signal output clock generating means for generating an audio signal output clock in synchronization with a video signal output clock which is used, together with the video signal output frame pulse, for outputting the video signals from the video signal rearranging means, and a sampling rate converting means for converting the sampling rate of the audio input signal to that corresponding to the audio signal output clock, and outputting the input audio signal whose sampling rate has been converted as an audio output signal.

A frame synchronizer according to another aspect of the present invention is so arranged as to use, as the above-defined frame other than the target frame, a frame either immediately before or after the target frame, when the detected input/output phase difference comes up to an amount of one frame.

A frame synchronizer according to another aspect of the present invention is arranged such that it further comprises a still image detection means for detecting whether the video signal input thereto is a still-state image, and wherein in a case that the detection result output from the still image detection means indicates that the input video signal is a still-state image, if the input/output frame phase difference output from the input/output frame phase difference detection means comes up to an amount of one frame, the video signal read control means generates a read control signal for controlling the frame synchronizer means, in such a manner as to read out the video signal of a frame other than the target frame.

A frame synchronizer according to another aspect of the present invention is arranged such that the synchronizer further comprises a scene change detection means for detecting whether the video signal input thereto is either immediately before or after a scene change, and wherein in a case that the detection result output from the scene change detection means indicates that the input video signal is either immediately before or after a scene change, if the input/output frame phase difference output from the input/output frame phase difference detection means comes up to an amount of one frame, the video read control means generates a read control signal for controlling the frame synchronizer means in such a manner as to read out the video signal of a frame other than the target frame.

A frame synchronizer according to further aspect of the present invention is arranged such that the frame synchronizing means further comprises: a plurality of frame memories for storing input video signals, a first selection means for selecting one of the plurality of frame memories, so as to write a corresponding one of the input video signals in the selected frame memory in accordance with a write control signal, and a second selection means for selecting one of the frame memories, so as to read out the video signal stored therein in accordance with a read control signal.

DETAILED DESCRIPTION OF THE PREFERRED EMBODIMENTS

Several embodiments of the present invention are now explained as in the followings.

[First Embodiment]

Figure 1:
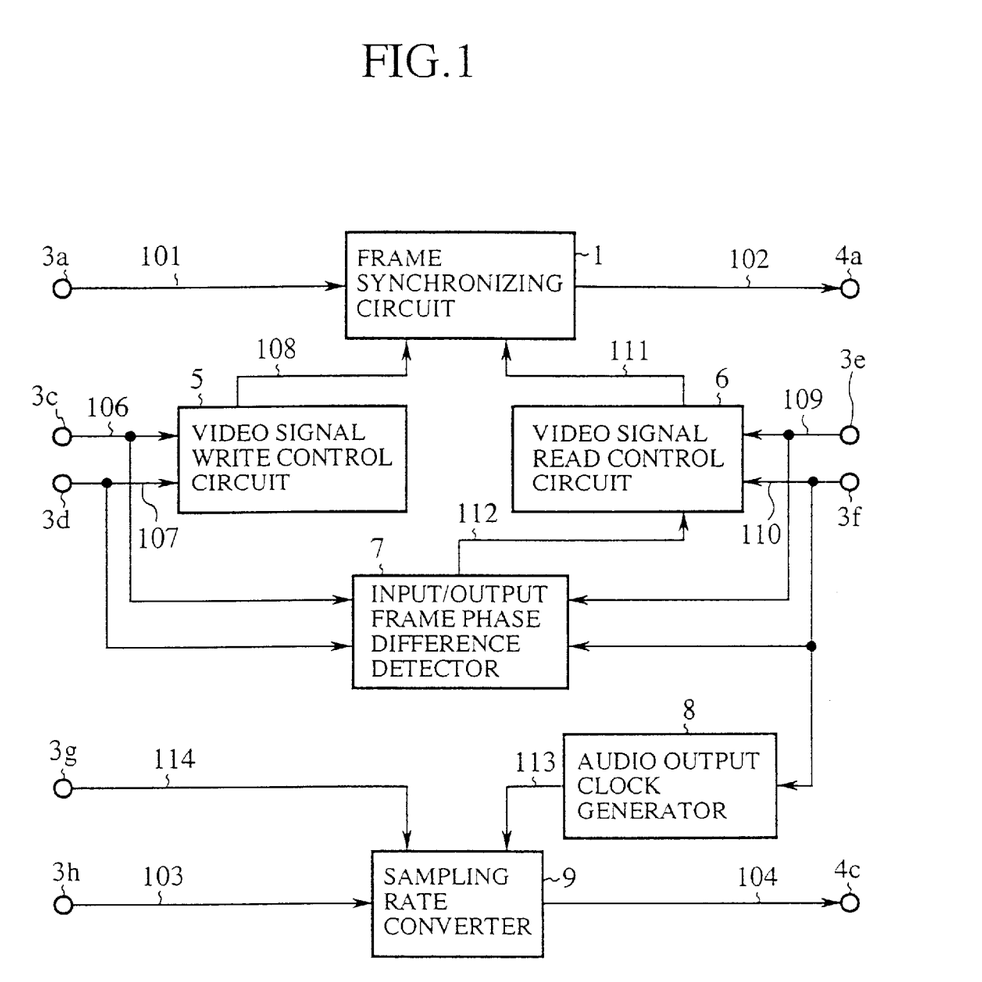
FIG. 1 is a schematic diagram showing the general configuration of a frame synchronizer according to a first embodiment of the present invention.

FIG. 1 is a schematic diagram showing the general configuration of a frame synchronizer according to a first embodiment of the present invention. In the figure, reference numeral 1 denotes a frame synchronizing circuit which is provided with a plurality of frame memories and capable of storing plural frames of video input signals therein, numeral 3a denotes an input terminal of the frame synchronizing circuit 1, and 4a denotes an output terminal of the frame synchronizing circuit 1. Further, reference numeral 101 denotes the above-mentioned video input signal, which is input through the input terminal and stored in a corresponding one of the plurality of frame memories provided in the frame synchronizing circuit 1, whereas numeral 102 denotes a video output signal, which is read out from the corresponding one of the frame memories and is output to the output terminal 4a. Noted that these portions explained above correspond to those having the same reference numerals in FIG. 7.

Further, reference numeral 5 denotes a video signal write control circuit for controlling the write operation of the video input signal 101 into each of the frame memories, and numerals 3c and 3d are input terminals of this video signal write control circuit 5, numeral 106 denotes a video input frame pulse which is input from the input terminal 3c to the video signal write control video input circuit 5, while 107 denotes a video input clock which is supplied from the input terminal 3d to the video signal write control circuit 5, numeral 108 denotes a write control signal for controlling the write operation of the video input signal 131, which is supplied from the video signal write control circuit 5 to the frame synchronizing circuit 1 on the basis of the video input frame pulse 106 and the video input clock 107.

Reference numeral 6 denotes a video signal read control circuit for controlling the read operation of the video output signal 102 from each of the frame memories in the frame synchronizing circuit 1, and numerals 3e and 3f are input terminals of this video signal read control circuit 6, numeral 109 denotes a video output frame pulse which is fed from the input terminal 3e to the video signal read control circuit 6, 110 denotes a video output clock which is fed through the input terminal 3f to the video signal read control circuit 6, and numeral 111 denotes a read control signal for controlling the read operation of the video output signal 102, which is supplied from the video signal read control circuit 6 to the frame synchronizing circuit 1 on the basis of the video output frame pulse 109 and the video output clock 110.

Reference numeral 7 denotes an input/output frame phase difference detector, which inputs the video input frame pulse 106 and the video input clock 107 branched from those input to the video signal write control circuit 5, and also inputs the video input frame pulse 109 and the video output clock 110 branched from those input to the video signal read control circuit 6, so as to detect a phase difference between the video input frame pulse 106 and the video output frame pulse 109, and reference numeral 112 denotes an input/output frame phase difference signal which is supplied from the input/output frame phase difference detector 7 to the video signal read control circuit 6.

Reference numeral 8 denotes an audio output clock generator, which inputs the video output clock 110 which branched from the one input to the video signal read control circuit 6, and generates an audio output clock on the basis of this video output clock 110, and numeral 113 denotes the audio output clock thus generated in this audio output clock generator 8.

Reference numeral 9 denotes a sampling rate converter for converting the sampling rate of an audio input signal to that of the corresponding audio output clock 113, numerals 3g and 3h both denote input terminals of the sampling rate converter 9, whereas numeral 4c denotes an output terminal of this sampling rate converter 9. Reference numeral 103 denotes the above-mentioned audio input signal, which is input through the input terminal 3h and fed to the sampling rate converter 9, whereas numeral 104 denotes an audio output signal output from the sampling rate converter 9 to the output terminal 4c, and numeral 114 denotes an audio input clock, which is input through the input terminal 3g and fed to the sampling rate converter 9.

The operation of the frame synchronizer according to the first embodiment is now explained below.

The video input signal 101 input through the input terminal 3a is fed to the frame synchronizing circuit 1. On the other hand, the video input frame pulse 106 input through the input terminal 3c, and the video input clock 107 input through the input terminal 3d are both fed to the video signal write control circuit 5, as well as to the input/output frame phase difference detector 7. Further, the video output frame pulse 109 supplied through the input terminal 3e and the video output clock 110 supplied through the input terminal 3f are both fed to the video signal read control circuit 6, as well as to the input/output phase difference detector 7.

The input/output phase difference detector 7 detects the phase difference between the video input frame pulse 106 and the video output frame pulse 109 on the basis of the video input clock 107 and the video output clock 110, as well as of the video output frame pulse 106 and the video output frame pulse 109, and outputs the thus detected input/output frame phase difference 112 to the video signal read control circuit 6.

When the video output frame pulse 109 is fed from the input terminal 3e, the video signal read control circuit 6 generates a read control signal 111 for controlling the read operation of the video output signal 102 out of the corresponding one of the frame memories in the frame synchronizing circuit 1 in accordance with the video output clock 110 supplied through the input terminal 3f. On this occasion, when the phase difference 112 comes up to an amount of one frame, the read control signal 111 controls, on the basis of the input/output frame phase difference 112 received from the input/output frame phase difference detector 7, the frame synchronizing circuit 1 so as to read out a video signal of another frame other than that of the target frame which was to be read out otherwise.

Note that in a case in which that the input/output frame phase difference 112 comes up to an amount of one frame, if the frame which is to be read out instead of the target frame is set to be either one of the immediately before or after the target frame, a frame synchronizer, which is capable of suppressing the timing discrepancy between a video signal and a corresponding audio signal to an amount below a predetermined level, yet without causing any interruption in the successive motion of the resultant picture image, can be obtained.

On the other hand, when the video input frame pulse 106 is supplied from the input terminal 3c, the video signal write control circuit 5 also generates a write control signal 108 for controlling the write operation of the video input signal 101 into the corresponding one of the frame memories in the frame synchronizing circuit 1, in accordance with the video input clock 107 input through the input terminal 3d.

The frame synchronizing circuit 1 stores the video input signal 101 input through the input terminal 3a in the corresponding one of the frame memories in accordance with the write control signal 108 received from the video signal write control circuit 5, and also reads out the stored signal in the frame memories in accordance with the read control signal 111 received from the video signal read control circuit 6, and outputs the thus read-out signal through the output terminal 4a as the video output signal 102.

Figure 2:
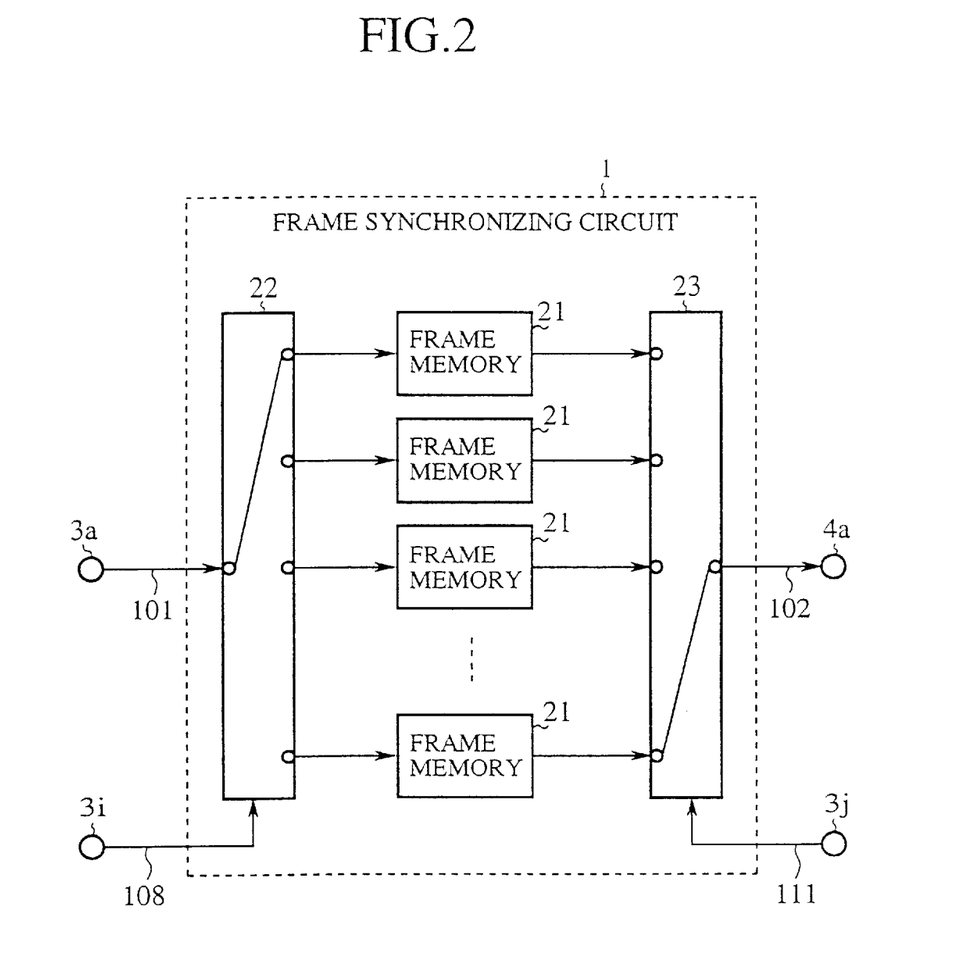
FIG. 2 is a schematic diagram showing an example of the inner configuration of the frame synchronizing circuit according to the first embodiment.

FIG. 2 is a schematic view showing one example of the inner configuration of the frame synchronizing circuit 1, wherein the explanation about each of the portions is omitted here by putting the same reference numerals to the portions corresponding to those in FIG. 2. In the figure, reference numeral 21 denotes a plurality of frame memories each for storing the corresponding one of the video input signals 101 fed through the input terminal 3a, numeral 22 denotes a selection circuit for deciding as to which video signal should be written into which one of the frame memories 21, numeral 23 denotes a selection circuit for deciding as to which one of the video signals written in each of the frame memories should be read out. Further, reference numeral 3i denotes an input terminal through which the write control signal 108 is input as a selection control signal for the selection circuit 22, and numeral 3j denotes an input terminal through which the read control signal 111 from the video signal read control circuit 6 is input as another selection control signal for the selection circuit 23.

As explained above, the video input signal 101 which is input through the input terminal 3a and fed to the frame synchronizing circuit 1 as configured above is first input to the selection circuit 22, and the write control signal 108 from the video signal write control circuit 5 is also input thereto as a selection control signal through the input terminal 3i. The selection circuit 22 selects each of the frame memories one by one in accordance with the write control signal 108, and stores each of the video input signals 101 fed through the input terminal 3*a* in the corresponding one of the selected frame memories.

Further, input to the selection circuit 23 through the input terminal 3*j* is the read control signal 111 from the video signal control circuit 6 as a selection control, and this selection circuit 23 selects each of the frame memories 21 one by one in accordance with the read control signal 111, and reads out each of the one-frame amount video signals stored therein. Each of the thus read-out video signals is output through the output terminal 4*a* as the video output signals 102.

On the other hand, the video output clock 110, which is input to the video signal read control circuit 6 through the input terminal 3*f* and used for reading out the video signals accumulated in the frame memories 21 in the frame synchronizing circuit 1, is also separately input to the audio output clock generator 8. The audio output clock generator 8 generates an audio output clock 113 for controlling the output of an audio output signal 104 (later explained) on the basis of this video output clock 110, and sends it to the sampling rate converter 9.

To the sampling rate converter 9, an audio input clock 114 for controlling the input of an audio input signal 103 is supplied trough the input terminal 3*g*, as well as the audio output clock 113 supplied from the audio output clock generator 8. The sampling rate converter 9 takes in the audio input signal 103 input through the input terminal 3*h* in accordance with the audio input clock 114, and converts the sampling rate thereof to that of the sampling rate of the audio output clock 113, before outputting the audio signal through the output terminal 4*c* as an audio output signal 104.

As explained above, even in the frame synchronizer according to the first embodiment, the frame synchronizing circuit 1 is provided with a plurality of frame memories just as the conventional frame synchronizer, and the write operation into each of the frame memories 21 is conducted in synchronization with the input signal, while the read operation is carried out by a reference synchronization within the individual stations. On this occasion, in the frame synchronizing circuit 1, video signals accumulated within the frame memories 21 are read out one after another, and if there comes a moment at which none of the signals therein has been readout yet, the contents of one of the frame memories is deleted, whereas if there comes a moment at which there are no signals left which have not been read out yet, then the contents of one of the frame memories is read out again.

In this first embodiment, the input/output frame phase difference detector 7 detects a phase difference between the video input frame pulse 106 and the video output frame pulse 109, sends the thus detected phase difference to the video signal read control circuit 6 as an input/output frame phase difference 112, and the video signal read control circuit 6 sends the read control signal 111 to the frame synchronizing circuit 1 so as to perform the above control operation, thereby to effectuate the frame synchronizing function.

Note that when the there comes a moment at which there are no signals left which have not been read out yet, it is not necessarily required to read out a certain frame again, but it suffices only if a certain field is read out twice, and by this operation, the successive motion of the resultant output picture image can be improved.

On the other hand, in this first embodiment, since the audio output clock generator 8 generates an audio output clock 113 in synchronization with the video signal clock 110, and sends this to the sampling rate converter 9 as an output clock, there will be no need to delete or repeat the audio signal value of the audio input signal 103 in the sampling rate converter 9, which would be required if the audio signal 103 was converted to the audio output signal 104 in synchronization with the video signal output signal 102.

As explained heretofore, according to the first embodiment of the present invention, a frame synchronizer, which is capable of suppressing a timing discrepancy between a video signal and a corresponding audio signal to an amount below a predetermined level, yet without causing any interruption in the resultant sound can be provided, and further, if a video signal is read out from the frame which is one before or after the target frame which was to be read out otherwise, then the successive motion of the resultant picture image can be improved.

(Second Embodiment)

Figure 3:
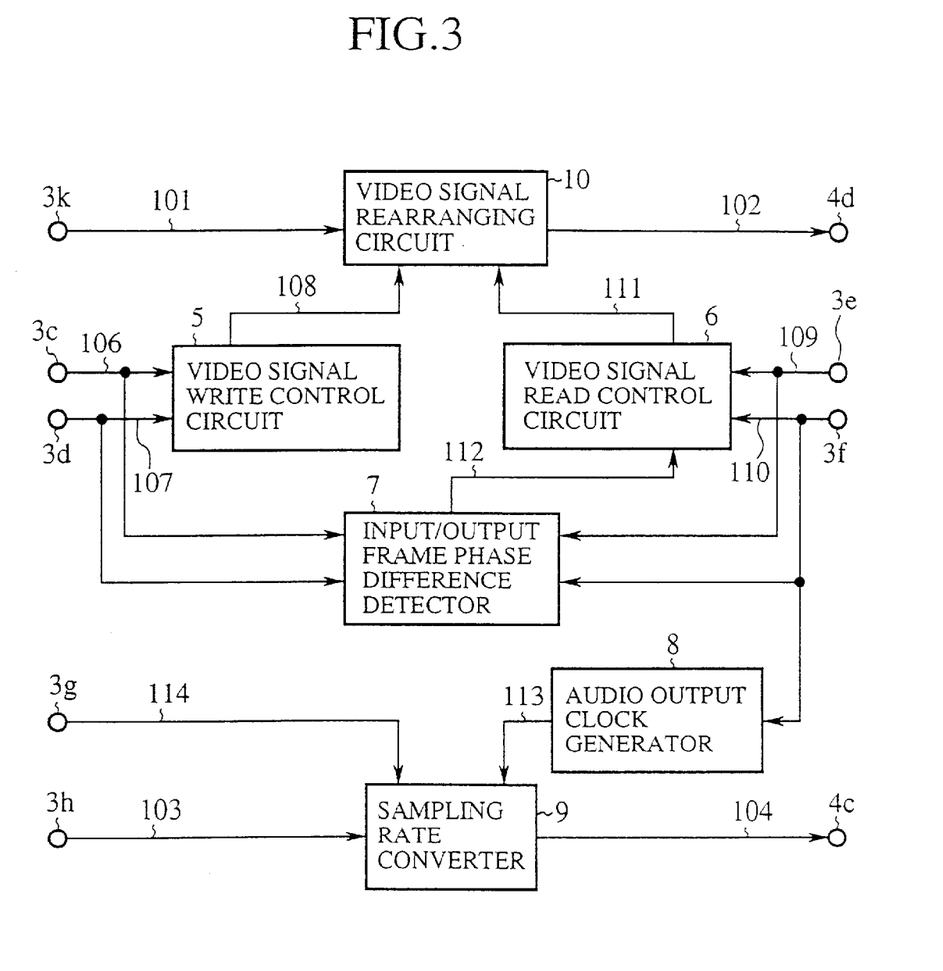
FIG. 3 is a schematic diagram showing the general configuration of a frame synchronizer according to a second embodiment of the present invention.

FIG. 3 is a schematic diagram showing the general configuration of a frame synchronizer according to a second embodiment of the present invention, wherein the portions corresponding to those in FIG. 1 are provided with same reference numerals, so that the explanation thereabout is omitted here. In the figure, reference numeral 10 denotes a video signal rearranging circuit that changes the order of a plurality of frames each storing the corresponding one of video input signals 101, and outputs the video signal in each of the thus rearranged frames as a video input signal 102. Reference numeral 3*k* denotes an input terminal of this video signal rearranging circuit 10 through which each of the video signals 101 are input, and numeral 4*d* denotes an output terminal of this video signal rearranging circuit 10 from which each of the video signals 102 are output. It is to be noted that the frame synchronizer according to this second embodiment is different from the first embodiment in that this video signal rearranging circuit 10 is employed instead of the frame synchronizing circuit 1 shown in FIG. 1.

Figure 4A:
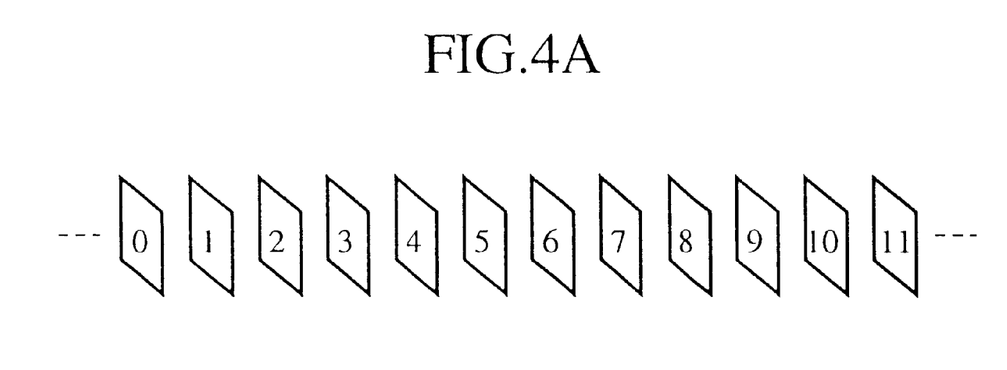
FIGS. 4A and 4B are exemplary views showing one example of a rearrangement of the video signals conducted in the second embodiment of the present invention.
Figure 4B:
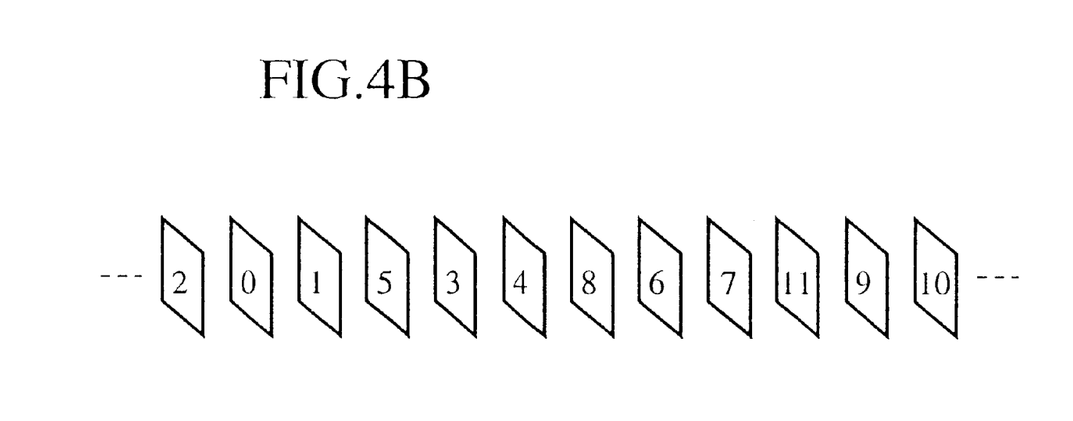

FIGS. 4A and 4B are exemplary views showing one example of the rearrangement carried out by the video signal rearranging circuit 10, wherein FIG. 4A shows the order of a plurality of frames each storing the video signal input to the video signal rearranging circuit 10, and FIG. 4B shows the rearranged order of the frames each storing the video signal output from the video signal rearranging circuit 10.

The operation of the frame synchronizer according to the second embodiment is now explained below.

The most popular encoding method in digital broadcasting and/or communications is the so-called MPEG method (Moving Picture Experts Group). The principal encoding tools for this MPEG method are the motion compensation prediction and the DCT (Discrete Cosine Transform), and normally the video input signals 101 are encoded by rearranging the frame order in order to effectuate this motion compensation prediction.

The rearrangement of video signals is explained with reference to FIGS. 4A and 4B, wherein the frames in the order of . . . , 1, 2, 3, 4, 5, 6, 7, 8, 9, 10, 11, . . . are rearranged to the order of . . . 2, 0, 1, 5, 3, 4, 8, 6, 7, 11, 9, 10, . . . , and are output from the video signal rearranging circuit 10. This rearrangement of video signals (or video frames) is implemented by a plurality of frame memories, or memories equivalent thereto. It is to be noted that the configuration of this video signal rearranging circuit 10 for effectuating this rearrangement of video frames is not explained into details here, as it is almost same as that of the frame synchronizing circuit 1 of the first embodiment shown in FIG. 2.

The video signal read control circuit 6 generates a read control signal 111, so that the video signals are output from the frame memories in the video signal rearranging circuit 10 in accordance with the video output frame pulse 109 and the video output clock 110 respectively input through the input terminals 3e and 3f. on this occasion, the read control signal 111 controls the video signal rearranging circuit 10 in such a manner as to output the video signal from a frame other than that of the target frame which is to be otherwise read out on the basis of the input/output frame difference signal 112, when the input/output frame phase difference 112 received from the input/output frame phase difference detector 7 comes up to an amount of one frame.

In this case further, when the input/output frame phase difference 112 comes up to an amount of one frame, if the frame which is to be read out instead of the target frame which was to be originally read out is set to be either one of immediately before or after the target frame, a frame synchronizer which is capable of suppressing a timing discrepancy between a video signal and a corresponding audio signal to an amount below a predetermined, yet without causing any interruption in the successive motion of the resultant picture image can be obtained.

According to the second embodiment of the invention, the video signal rearranging circuit 10 contains a plurality of frame memories, wherein the write operation of each of the video signals into these frame memories is performed by synchronizing with each of the input video signal, and the read operation therefrom is performed by synchronizing with a reference synchronization within the individual stations. On this occasion, the video signals accumulated in the frame memories are read out one after another in the rearranged order, and when it comes to a state in which no signal within the frames has been read out yet, or the state in which all these signals have already been read out, the frame synchronizer function can be effectuated, respectively by deleting the contents within one frame, and by reading twice the contents within one frame.

In this second embodiment, just as the first embodiment, the input/output frame phase difference detector 7 detects a phase difference between the video input frame pulse 106 and the video output frame pulse 109, and sends the thus detected phase difference to the video signal read control circuit 6 as an input/output frame phase difference 112, and the video signal read control circuit 6 sends the read control signal 111 to the video signal rearranging circuit 10 so as to perform the above control operation, thereby to effectuate the frame synchronizer function.

Note that when it comes to the state in which all the signals in these frame memories have been read out, it is not required to read out an entire certain frame again, but it suffices only if a certain field is read out twice, and by this operation the successive motion of the resultant picture image can be improved.

On the other hand, in this second embodiment, just as the first embodiment, the audio output clock generator 8 generates an audio output clock 113 in synchronization with the video signal clock 110, and sends this to the sampling rate converter 9 as an output clock. Due to this, there will be no need to delete or repeat the audio signal value of the audio input signal 103 in the sampling rate converter 9, which would be required if the audio input signal 103 was converted to the audio output signal 104 which is in synchronization with the video signal output signal 102.

As explained heretofore, according to the second embodiment of the present invention, a frame synchronizer, which is capable of suppressing a timing discrepancy between a video signal and a corresponding audio signal to an amount below a predetermined level, yet without causing any interruption in the resultant sound can be provided. Further, if a video signal is read out from the frame which is one before or after the target frame which was to be read out otherwise, then the successive motion of the resultant picture image can be improved.

(Third Embodiment)

Figure 5:
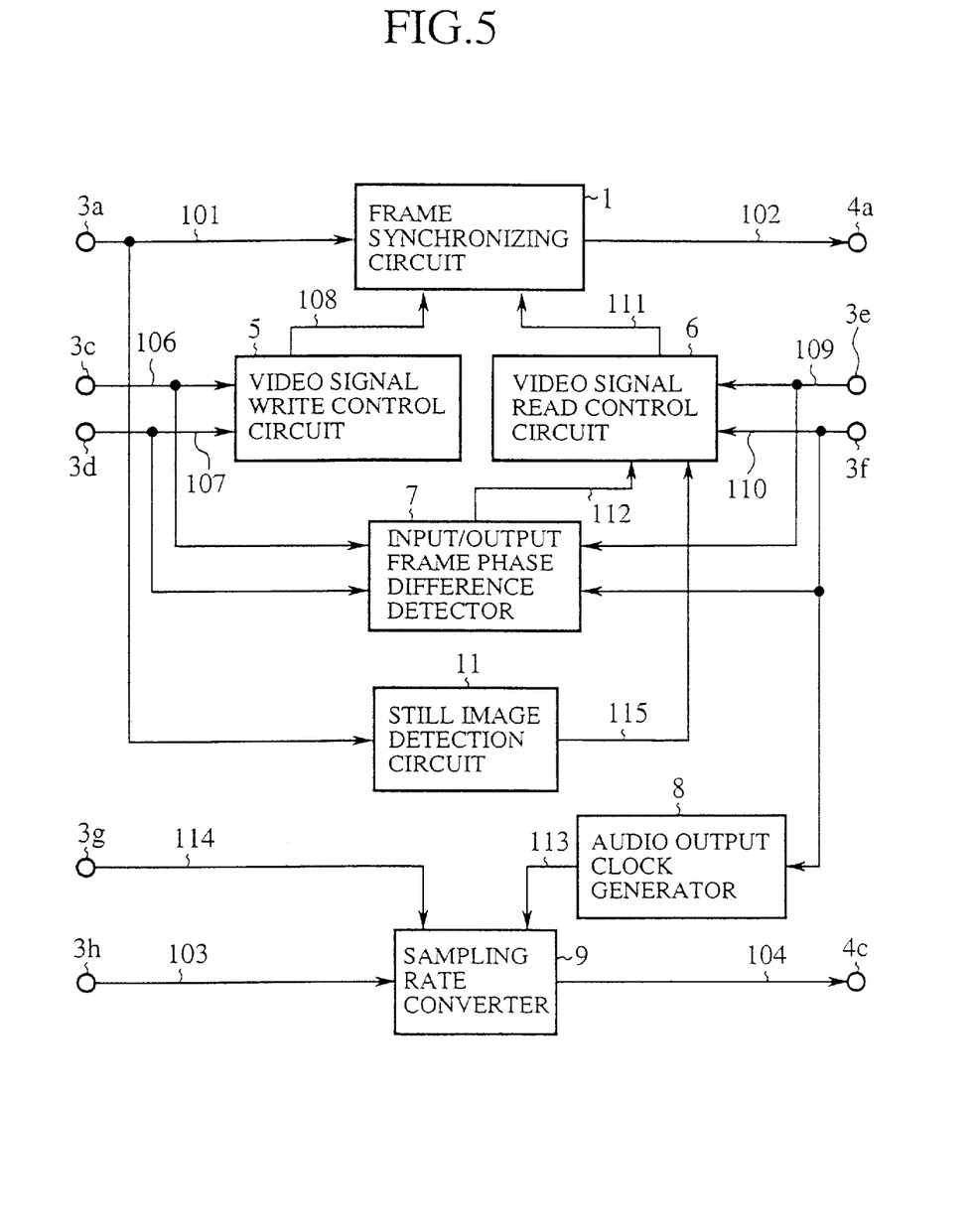
FIG. 5 is a schematic diagram showing the general configuration of a frame synchronizer according to a third embodiment of the present invention.

FIG. 5 is a schematic diagram showing the general configuration of a frame synchronizer according to a third embodiment of the present invention, wherein the portions corresponding to those in FIG. 1 are provided with same reference numerals, so that the explanation thereabout is omitted here. In the figure, reference numeral 11 denotes a still image detection circuit which detects whether or not the corresponding input video signal 101 is in a still state, when it receives the branched video input signal 101, and numeral 115 denotes a detection result output from the still image detection circuit 11 and fed to the video signal read control circuit 6.

By the way, in a case in which the detection result 115 output from the still image detection circuit 11 indicates that the input video signal is in a still state, when the corresponding input/output frame phase difference 112 comes up to an amount of one frame, then the video signal read control circuit 6 generates a read control signal 111 for controlling the frame synchronizing circuit 1, in order that the video signal of a frame other than that of the target frame which was to be read out otherwise is read out instead of the signal of the target frame, which is different from the first embodiment.

The operation of the frame synchronizer according to the third embodiment is now explained below.

The frame synchronizing circuit according to the third embodiment is provided with the still image detection circuit 11, and a video input signal 101 which is fed through the input terminal 3a to the frame synchronizing circuit 1 is branched and input thereto. The still image detection circuit 11 detects whether or not the input video signal is currently in a still state, and outputs the thus detected result 115 to the video signal read control circuit 6. When the video signal is found out to be in a still state, then the video signal read control circuit 6 deletes the contents of a certain frame memory in the frame synchronizing circuit 1 or reads again the same contents just as the case of the first embodiment, on the basis of the detected result 115.

In other words, when the detected result 115 indicate that the currently input video signal is in a still state, after the input/output frame phase difference 112 fed from the input/output frame phase difference detector 7 exceeded a certain value, the deletion of the contents in a frame memory or reading the same contents again is immediately carried out. In this case, if the detected result does not indicate that the video signal is in a still state, then the deletion of the contents in a frame memory or twice reading of the same contents is executed but with a timing at which reading from or writing into the frame memories in the frame synchronizing circuit 1 is not hampered. By this operation, the successive motion of the resultant picture image output from the video signal 102 can be greatly improved.

Here, the still image detection circuit 11 detects whether or not the video input signal 101 is in a still state in accordance with the following manner.

First, the differential value between adjacent two frames is calculated, and the thus obtained differential value is converted to be an absolute value. On this occasion, if this absolute value is less than a threshold value, then it is determined that the video input signal 101 is of a still-state picture. It is to be noted that although a memory of one frame capacity is required for calculating the differential signal between adjacent frames, the frame memories provided in the frame synchronizing circuit 1 can also be used for this purpose.

Further, the above method of detecting whether or not the video input signal 101 is in a still state by use of the sill image detection circuit 11 is only one example. That is, this invention is not provided only for regulating the method itself of detecting the still state performed in the still image detection circuit 11.

Still further, although the still image detection circuit 11 is applied to the frame synchronizer provided with a frame synchronizing circuit 1 as shown in the first embodiment in the above explanation, it can also be applied to the frame synchronizer provided with the video signal rearranging circuit 10 as shown in the second embodiment, as there is no functional difference provided thereby.

As explained above, according to the third embodiment of the present invention, a frame synchronizer which is capable of suppressing a timing discrepancy between a video signal and a corresponding audio signal to an amount below a predetermined level, yet free of interruption in the resultant picture image can be implemented.

(Fourth Embodiment)

Figure 6:
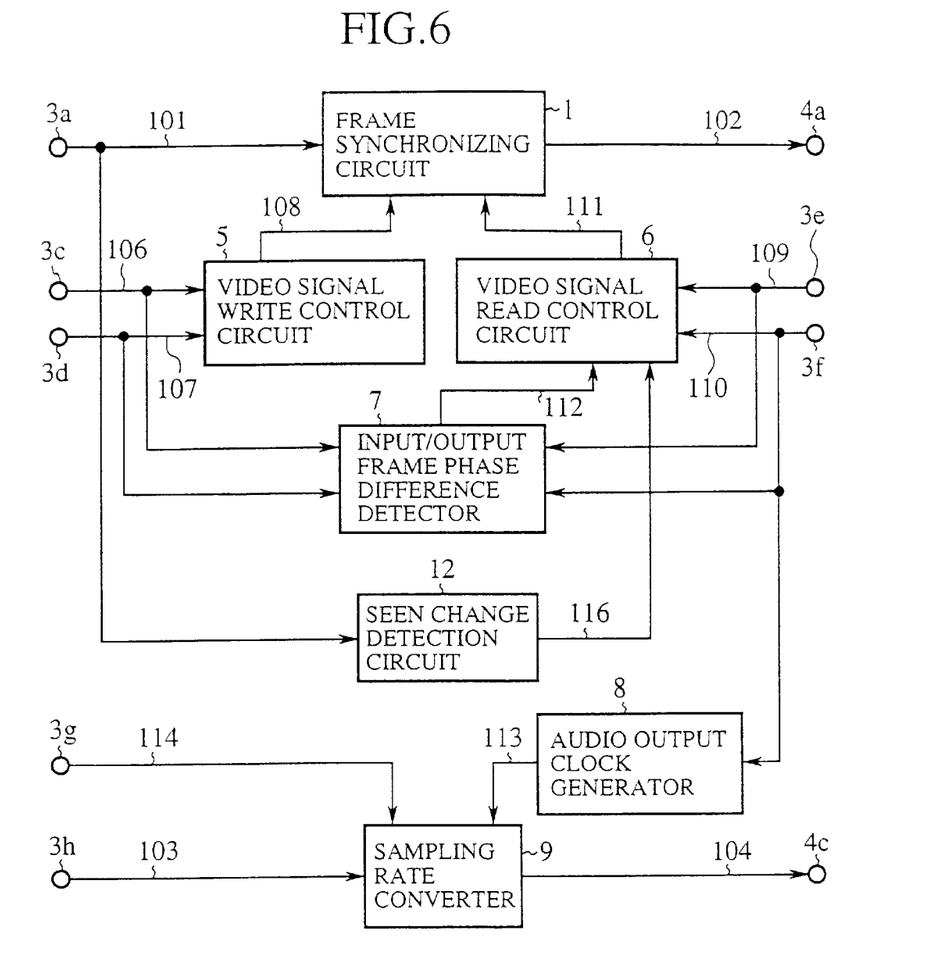
FIG. 6 is a schematic diagram showing the general configuration of a frame synchronizer according to a fourth embodiment of the present invention.

FIG. 6 is a schematic diagram showing the general configuration of a frame synchronizer according to a fourth embodiment of the present invention, wherein the portions corresponding to those in FIG. 1 are provided with the same reference numerals, so that the explanation thereabout is omitted here. In the figure, reference numeral 12 denotes a scene change detection circuit which receives a video input signal 101 fed through the input terminal 3a, and detects whether or not the input video signal 101 is before or after a scene change, and numeral 116 denotes a result of the scene change detection, which is output from the scene change detection circuit 12 to the video signal read control circuit 6.

By the way, in a case in which the detection result 116 output from the scene change detection circuit 12 indicates that the currently input video signal 101 is either immediately before or after a scene change, when the corresponding input/output frame phase difference 112 received from the input/output frame phase difference detector 7 comes up to an amount of one frame, then the video signal read control circuit 6 generates a read control signal 111 for controlling the frame synchronizing circuit 1, in such a manner that the video signal in a frame other than that of the target frame which was to be read out otherwise is read out instead of the one in the target frame, which is different from the first embodiment.

The operation of the frame synchronizer according to the fourth embodiment is now explained below.

The frame synchronizing circuit according to the fourth embodiment is, as explained above, provided with the scene change detection circuit 12, and a video input signal 101 which is fed through the input terminal 3a to the frame synchronizing circuit 1 is branched and input thereto. The scene change detection circuit 12 detects whether or not the currently input video signal is either before or after a scene change, and outputs the thus detected result 116 to the video signal read control circuit 6. When the video signal is found out to be either immediately before or after a scene change, then the video signal read control circuit 6 deletes the contents of a certain frame memory in the frame synchronizing circuit 1 or read again the same contents just as the case of the first embodiment, on the basis of the detected result 116.

In other words, when the detected result 116 indicates that the currently input video signal is either immediately before or after a scene change, after the input/output frame phase difference 112 fed from the input/output frame phase difference detector 7 exceeded a certain value, the deletion of the contents in a frame memory or reading the same contents twice is immediately executed. In this case, if the detected result does not indicate that the video signal is neither immediately before nor after a scene change, then the deletion of the contents in a frame memory or twice reading of the same contents is executed but with a timing at which reading from or writing into the frame memories in the frame synchronizing circuit 1 is not hampered. By this operation, the successive motion of the resultant picture image output from the video signal 102 can be greatly improved.

Here, the scene change detection circuit 12 detects a scene change in accordance with the following manner.

First, the differential value between adjacent two frames of the video input signals is calculated, and sum of the absolute value of each of these differential values is calculated. Thereafter, if the total sum of these absolute values is more than a threshold value, then it is determined that there is a scene change in the video input signal 101. It is to be noted that although a memory of one frame capacity is required for calculating the differential signal between adjacent frames, the frame memories provided in the frame synchronizing circuit 1 can also be used for this purpose.

Further, the above method of detecting a scene change by use of the scene change detection circuit 12 is only one example, and in fact, other methods can be replaced for this method. That is, this invention is not provided only for regulating the method itself of detecting the existence of a scene change.

Still further, although the scene change detection circuit 12 is applied to the frame synchronizer provided with a frame synchronizing circuit 1 as shown in the first embodiment in the above explanation, it can also be applied to the frame synchronizer provided with the video signal rearranging circuit 10 as shown in the second embodiment, since there is no functional difference provided thereby.

As explained above, according to the fourth embodiment of the present invention, a frame synchronizer which is capable of suppressing a timing discrepancy between a video signal and a corresponding audio signal to an amount below a predetermined level, yet without causing any interruption in the resultant picture image can be implemented.

As explained heretofore, the present invention is arranged such that the reading operation of the video signal accumulated in the frame synchronizing circuit is controlled on the basis of a read control signal fed from the video signal read control circuit, and the sampling rate of the audio input signals is converted to that of an audio signal output clock generated by the video output clock used then. Due to this, a frame synchronizer which has no interruption in the sequence of a resultant sound, yet capable of suppressing a timing discrepancy between a video signal and a corresponding audio signal to an amount below a predetermined level can be implemented.

Further, the present invention is arranged such that the output of the video signal fed from the video signal rearranging circuit is controlled on the basis of a read control signal fed from the video signal read control circuit, and the sampling rate of the audio input signals is converted to the timing of an audio signal output clock generated by the video output clock used then. Due to this, a frame synchronizer which has no interruption in the resultant sound, yet capable of suppressing a timing discrepancy between a video signal and a corresponding audio signal to an amount below a predetermined level can be implemented.

Further, the present invention is arranged such that the frame whose content is to be read out when the input/output phase difference comes up to an amount of one frame is the one which is either immediately before or after the target frame which was to be read out otherwise, and due to this, a frame synchronizer which is capable of suppressing the timing discrepancy between a video signal and a corresponding audio signal to an amount below a predetermined level, yet free of interruption in the successive motion of the resultant picture image can be implemented.

Still further, the frame synchronizer according to the present invention is arranged such that when the frame phase difference comes up to an amount of one frame in a case that the video signal is in a still state, the video signals of a frame other than that of the target frame which was to be read out otherwise is read out, and due to this, a frame synchronizer which is capable of suppressing the timing discrepancy between a video signal and a corresponding audio signal to san amount below a predetermined value, yet free of interruption in the successive motion of the resultant image can be implemented.

Yet still further, the frame synchronizer according to the present invention is arranged such that when the frame phase difference comes up to an amount of one frame in a state that the video input signal is of immediately before or after a scene change, the video signal of a frame other than that of the target frame which was to be read out, and due to this, a frame synchronizer which is capable of suppressing the timing discrepancy between a video signal and a corresponding audio signal to an amount below a predetermined level, yet without causing any interruption in the successive motion of the resultant image can be implemented.

What is claimed is:

1. A frame synchronizer comprising:
    a frame synchronizing means for storing input video signals of a plurality of frames, and outputting the stored video signals one after another;
    an input/output frame phase difference detection means for detecting a phase difference between a video signal input frame pulse used for storing each of the input video signals in said frame synchronizing means and a video signal output frame pulse used for reading out each of the stored video signals from said frame synchronizing means,
    a video signal read control means for generating a read control signal for controlling said frame synchronizing means in such a manner as to read out the video signal of a frame other than that of the target frame which was to be read out otherwise, when the input/output phase difference detected by said input/output frame phase difference detection means comes up to an amount of one frame,
    an audio signal output clock generating means for generating an audio signal output clock in synchronization with a video signal output clock which is used, together with said video signal output frame pulse, for reading out the video signals from said frame synchronizing means, and
    a sampling rate converting means for converting the sampling rate of the audio input signal to that corresponding to said audio signal output clock, and outputting the input audio signal whose sampling rate has been converted as an audio output signal.

2. A frame synchronizer according to claim 1, wherein said synchronizer uses, as said frame other than the target frame, a frame either immediately before or after the target frame, when the detected input/output phase difference comes up to an amount of one frame.

3. A frame synchronizer according to claim 1, wherein said frame synchronizer further comprises a still image detection means for detecting whether or not the video signal input thereto is a still-state image, and wherein in a case that the detection result output from said still image detection means indicates that said input video signal is a still-state image, if the input/output frame phase difference output from said input/output frame phase difference detection means comes up to an amount of one frame, said video signal read control means generates a read control signal for controlling the frame synchronizer means, in such a manner as to read out the video signal of a frame other than the target frame.

4. A frame synchronizer according to claim 1, wherein said frame synchronizer further comprises a scene change detection means for detecting whether or not the video signal input thereto is either immediately before or after a scene change, and wherein in a case that the detection result output from said scene change detection means indicates that said input video signal is either immediately before or after a scene change, if the input/output frame phase difference output from said input/output frame phase difference detection means comes up to an amount of one frame, said video read control means generates a read control signal for controlling the frame synchronizer means in such a manner as to read out the video signal of a frame other than the target frame.

5. A frame synchronizer according to claim 1, wherein said frame synchronizing means further comprises:
    a plurality of frame memories for storing input video signals,
    a first selection means for selecting one of said plurality of frame memories, so as to write a corresponding one of said input video signals in the selected frame memory in accordance with a write control signal, and
    a second selection means for selecting one of said frame memories, so as to read out the video signal stored therein in accordance with a read control signal.

6. A frame synchronizer comprising:
    a video signal rearranging means for storing input video signals of a plurality of frames, rearranging the order of said frames, and outputting each of the frames whose order has thus been rearranged,
    an input/output frame phase difference detection means for detecting a phase difference between a video signal input frame pulse used for inputting each of the video signals to said video signal rearranging means and a video signal output frame pulse used for outputting each of said rearranged video signals from said video signal rearranging means,
    a video signal read control means for generating a read control signal for controlling said video signal rearranging means in such a manner as to output the video signal of a frame other than that of the target frame which was to be output otherwise, when the input/output phase difference detected by said input/output frame phase difference detection means comes up to an amount of one frame,
    an audio signal output clock generating means for generating an audio signal output clock in synchronization with a video signal output clock which is used, together with said video signal output frame pulse, for outputting the video signals from said video signal rearranging means, and a sampling rate converting means for converting the sampling rate of the audio input signal to that corresponding to said audio signal output clock, and outputting the input audio signal whose sampling rate has been converted as an audio output signal.

7. A frame synchronizer according to claim 6, wherein said frame synchronizer uses, as said frame other than the target frame, a frame either immediately before or after the target frame, when the detected input/output phase difference comes up to an amount of one frame.

8. A frame synchronizer according to claim 6, wherein said frame synchronizer further comprises a still image detection means for detecting whether or not the video signal input thereto is a still-state image, and wherein in a case that the detection result output from said still image detection means indicates that said input video signal is a still-state image, if the input/output frame phase difference output from said input/output frame phase difference detection means comes up to an amount of one frame, said video signal read control means generates a read control signal for controlling the frame synchronizer means, in such a manner as to read out the video signal of a frame other than the target frame.

9. A frame synchronizer according to claim 6, wherein said frame synchronizer further comprises a scene change detection means for detecting whether or not the video signal input thereto is either immediately before or after a scene change, and wherein in a case that the detection result output from said scene change detection means indicates that said input video signal is either immediately before or after a scene change, if the input/output frame phase difference output from said input/output frame phase difference detection means comes up to an amount of one frame, said video read control means generates a read control signal for controlling the frame synchronizer means in such a manner as to read out the video signal of a frame other than the target frame.

10. A frame synchronizer according to claim 6, wherein said video signal rearranging means further comprises:

a plurality of frame memories for storing input video signals, a first selection means for selecting one of said plurality of frame memories, so as to write a corresponding one of said input video signals in the selected frame memory in accordance with a write control signal, and a second selection means for selecting one of said frame memories, so as to read out the video signal stored therein in accordance with a read control signal.

* * * * *